United States Patent
Quick

[11] Patent Number: 5,793,042
[45] Date of Patent: Aug. 11, 1998

[54] INFRARED SPECTROPHOTOMETER ACCELERATED CORROSION-EROSION ANALYSIS SYSTEM

[76] Inventor: Nathaniel R. Quick, 894 Silverado Ct., Lake Mary, Fla. 32746

[21] Appl. No.: 721,747

[22] Filed: Sep. 30, 1996

[51] Int. Cl.$^6$ ........................................ G01J 1/06
[52] U.S. Cl. .................. 250/339.08; 250/339.07; 250/341.1; 250/341.6
[58] Field of Search ............ 250/339.08, 339.07, 250/339.06, 341.1, 341.6; 356/346, 244

[56] References Cited

U.S. PATENT DOCUMENTS

| 4,454,472 | 6/1984 | Moore | 324/158 R |
| 5,386,121 | 1/1995 | Barbee et al. | 250/341.8 |
| 5,536,359 | 7/1996 | Kawada et al. | 156/626.1 |

FOREIGN PATENT DOCUMENTS 4-04355349  12/1992  Japan ................ 250/339.08

Primary Examiner—Michael J. Tokar
Assistant Examiner—Richard Hanig
Attorney, Agent, or Firm—Clay Holland, Jr.

[57] ABSTRACT

A preferred embodiment of the system and a method are provided utilizing Fourier Transform Infrared Spectrophotometer (FTIR) for examination and analysis of materials on a real-time basis in a chamber at elevated temperatures with corrosive-erosive gaseous environments that cause accelerated material deterioration. The apparatus is capable on a real-time basis of examining and analyzing a wide variety of materials subjected to accelerated deterioration events missed by prior art systems and methods. Empirical data of accelerated corrosion-erosion events are also acquired and stored for subsequent computer analysis of recorded absorbed and reflected vibrational frequencies detected. The system utilizes preselected adjustable grazing angles of an incident beam of the infrared beam impinging upon a material sample during the observation and analysis processes to enhance the data to be collected. The system provides feed back laser signals for alignment adjustment for the selectable grazing angles.

8 Claims, 5 Drawing Sheets

INFRARED SPECTROPHOTOMETER ACCELERATED CORROSION-EROSION ANALYSIS SYSTEM

FIELD OF INVENTION

The present invention relates to apparatus and processes for measurement, life assessment and analysis of the accelerated real-time deterioration effects of corrosion/erosion of materials, devices and structures while exposed to elevated temperature and hostile gaseous environmental.

BACKGROUND OF THE INVENTION

In the prior art Fourier Transform Infrared (FTIR) spectrophotometery techniques are well known techniques to improve the signal-to-noise ratio by multiple interactions with a sample's surfaces to provide a real-time surface monitoring capability at mono-layer levels.

Steven G. Barbee, et al, in U.S. patent Ser. No. 5,386,121, entitled "In Situ, Non-Destructive CVD Surface Monitor", issued Jan. 31, 1995, discloses an in-situ monitoring and process control technique using Fourier Transform Infrared spectrophotometery with Multiple Internal Reflections (FTIR-MIR) which looks at the Si—H bond vibrations. The technique disclosed is reputed to be useful in monitoring UHV Chemical Vapor Deposition (CVD), Low Pressure CVD (LPCVD), mid-pressure and atomiospheric Chemical Vapor Deposition (CVD) systems. In the system a substrate under analysis is configured, i.e., bevelled ends at 45°, so that output signal has a predetermined angle on exiting the substrate after Multiple Internal Reflections (MIR) which can look at the Si—H bond vibrations on a silicon sample's surfaces. The technique is used to monitor a critical passivating hydrogen layer on the surface necessary for successful epitaxial growth, and it is the integrity of this critical passivating layer that is monitored so as to readily detect surface changes when destructive species are introduced to the substrate surfaces.

In the prior art the principal underlying infrared spectrophotometery have been appreciated for more than a century. It is understood to be one of the few techniques that can provide information about chemical bonding in materials. It is useful for the nondestructive analysis of solids and thin films. Chemical bonding tests vary widely in their sensitivity to probing by infrared techniques. For example, carbon-sulfur bonds often give no infrared signal and so cannot be detected at any concentration, while silicon-oxygen bonds can produce signal intense enough to be detected when probing sub-mono-layer quantities. Thus, the utility of infrared spectrophotometery is a function of the chemical bond of interest, rather than being applicable as a generic probe.

The goal of most basic infrared experiment is to determine changes in the intensity of a beam of radiation as a function of wavelength or frequency, after it interacts with a material sample. The function of the infrared spectrophotometer is to disperse the light from a broadband infrared source so that its intensity at each frequency can be measured and analyzed. The ratio of the intensity before and after the light interacts with the sample is determined and a plot of this ratio versus frequency is known as the infrared spectrum.

Further in the prior art, it has been concerned with utilizing infrared spectrophotometery technology as a tool for nondestructive test and analysis on materials and products at ambient temperatures and in non-hostile environments. No techniques are known wherein infrared technology is used for test and analysis of materials and products on a real-time basis or as simulated accelerated life-test basis, at elevated temperatures and in hostile environments.

However, accelerated testing and life assessment of materials, components and products have been used in the prior art in several industries to ascertain changes to them over time. Notably in such industries, for example, as the paint, electronics component, metal fabrication and chemical industries. In each of these industries the products and materials thereof may be subjected to elevated temperatures and non-ambient environments. The evaluation of such exposure is usually conducted at specified time intervals during the tests or at the conclusion thereof. Such evaluation processes frequently include examination of the materials and products after testing by means of the naked human eye; examination for changes in the physical, chemical or electrical properties with the aid of various devices; and examination for changes in color, texture or physical appearance also with the aid of other devices. These types of examination and analysis after the fact of testing have proven wholly inadequate for predicting what changes have occurred in the materials or products on a real-time basis. More, specifically, it is difficult, if not impossible to ascertain, for example, whether the changes are as a result of processes such as chemical oxidation and reduction, formation of new or and different surfaces or structural changes; and more importantly, it is also difficult, if not impossible to determine when, time-wise, such undesirable changes have occurred. Thus, there exist in the prior art a long standing and significant need for test and analysis systems to provide real-time information and data that is useful in determining what changes have occurred and when these changes have occurred. Such information and data on a real-time bases would be useful in understanding the nature of the occurrences and when they occurred, and therefore, would be useful in predicting useful life of materials and products, what changes may occur during its useful life, and as an aid in the design and manufacture of more reliable and longer life materials and products. For example, its has been recognized in metal fabrication industry that the lack of such real-time information and data during the life or accelerated life test of various fabricated materials has had a significant impact in reducing the gross national economy of the United States because of materials corrosion and failure.

The present invention utilizes infrared spectrophotometery technology to provide apparatus and processes for addressing and solving the foregoing long standing problem in the prior art by providing real-time information and data of tests made on materials and products while they are selectively subjected to various conditions of elevated temperatures and hostile environments simulating and accelerating real life time conditions.

BRIEF SUMMARY OF THE INVENTION

The present invention provides apparatus and a method utilizing Fourier Transform Infrared Spectrometer (FTIR) for non-destructive and destructive examination and analysis of solids and thin films, at elevated temperatures and corrosive-erosive gaseous\vapor environments to provide real-time empirical data of accelerated corrosive-erosive events in a contained chamber. Such real-time data is acquired and stored for subsequent computer analysis. In accordance with the present invention, the apparatus utilizes a pair of adjustable infrared transmission mirrors to provide preselectable grazing angles of the infrared incident impinging and reflective beams during observations and analysis, while utilizing various testing methods. These adjustable mirrors enable the apparatus to be adjusted to provide a wide range of grazing angles (0–85 degrees from the normal to the sample substrate), especially certain angles that have been determined critical in some applications of the inventive concept.

The FTIR spectrometer also measures the concentration and change in concentration of the gaseous species which initiate corrosion in the same spectra. The gaseous species frequency band is distinct and separate from the frequency band for the metal oxides and surface corrosion salt species.

The apparatus of the present invention, also includes a companion laser system which is used to provide feed-back signals to the apparatus for continuous adjustment of the adjustable infrared transmission mirrors, so that the impinging infrared beam strikes a sample target at the desired grazing angle. As an alternate means the grazing angle for the impinging infrared beam may be controlled by a laser using a feedback signal derived from the target platform upon which a target is located during test. Feedback signals to the laser enable the laser to move an adjustable target platform so as to maintain the desirable grazing angle(s).

In addition to the foregoing features of the present invention, the apparatus includes a chamber into which a target or sample platform is provided, upon which test samples are placed during test and analysis. The platform may also elevate the temperature of the chamber and sample when an electrical heating element, such as a laser synthesized silicon carbide resistance proximity heater, that is preferred because it is corrosion resistance at high temperatures, thereof is energized. The chamber has input and output transmission windows, such as highly pure silicon carbide which has a use temperature of 925° C., silicon is corrosion resistant but has a use temperature of only 300° C. and has a frequency gap 360 to 660 $cm^{-1}$, diamond has a use temperature of 730° C., but is ten times more expensive, Cadmium Telluride and Zinc Selenide are both brittle and have a maximum use temperature of 300° C., while polyethylene transmits down to 250 $cm^{-1}$ at room temperature but must be isolated from high temperatures to accommodate the incoming and exiting infrared and laser beams. Diamond rich surface layers created by chemical deposition, ion implantation and similar methods and fluoride such as $MgF_2$ may also prove useful. It also has accessible ports to accommodate the injection of selected gases and the removal thereof; and another port is provided to provide support for the target platform, to provide electrical input power and to receive feedback electrical signals from the target platform useful to the laser for angular adjustment of the target platform.

The apparatus utilizes two moveable mirrors and two fixed mirrors. The moveable mirrors are adjusted mechanically or by feedback signals used by the laser for such adjustments. One moveable mirror intercepts the incident infrared and laser beams before they enter the chamber through an input window and a second moveable mirror intercepts and transmits the infrared and laser beams exiting the chamber through an exit or output window. A first and second fixed mirror are disposed along the output beams path. The second or last mirror communicates infrared and laser signals to a detector which subsequently transmits such signal via an interfacing device to the FTIR control system for processing and transmission to data acquisition and storage device. Liquid nitrogen cooled mercury cadmium telluride (MCT) detectors are typically used and are protected by the same window material used in the chamber. Systematized collection and recorded data may be monitored on a real-time basis by a monitor device or may be analyzed later from the stored data.

In another embodiment of the present invention, apparatus and methods are provided that enable the examination and analysis at a field site or at an in-plant site to ascertain the scope and nature of the internal material surface deterioration or failure in chemical processing containers, storage tanks and the like, when such material surfaces have been or being exposed to corrosive/erosive gaseous/vapor and elevated temperatures during their normal uses. Such tests and analysis may be done as an interim or after-the-fact occurrence, and therefore, may be useful for future container or storage tank material selection and design. In this embodiment the apparatus, in accordance with the teachings of the present invention, is viewed as portable for field or on-site use. Thus, the apparatus may be used to examine and analyze the interior surface of a container or tank in an after-the-fact use mode or during an active manufacturing processing mode where these enclosures are subjected to corrosive/erosive and elevated temperatures on a real-time basis.

As used herein the terms "systematized", "systematizing" and "systematization" means to analyze and the arrangement of data in accordance with a plan or scheme derived from data collected from the interferogram which are processed by the Fourier integral using a fast Fourier transform (FFT) algorithms.

BRIEF DESCRIPTION OF THE DRAWINGS

The invention can be described in more detail with the aid of the accompanying drawings wherein.

DETAIL DESCRIPTION OF THE INVENTION

A brief discussion of the theory of operation of the Fourier Transform Infrared (FTIR) spectroscopy may be helpful in understanding its relation and use in connection with the present invention. One of the primary objects of the present invention is to use specular reflectance from the surface of a sample in a hostile environment of elevated temperatures and corrosive gases, as a way of analyzing the sample while simulating the accelerated life thereof and further monitoring such analysis on a real-time basis.

The infrared spectroscope's main purpose is to determine an optical intensity versus frequency or wavelength. It needs a light source, a means to set or measure wavelength, a detector and a device to record the spectrum. In theory, a standard technique for visible light spectroscopy uses a black-body source with a dispersive grating spectrometer as the wavelength selector. The forbearer spectroscopy uses a black-body source, but replaces the dispersive grating spectrometer with a Michelson interferometer. This gives the Fourier transforms of the desired spectrum, known as the interferogram. The interferogram requires extensive computer manipulation to yield the desired intensity versus wavenumber spectrum. The basic process in FTIR spectroscopy is light wave interference. The data collected from the interferogram are processed by the Fourier integral using fast Fourier transform (FFT) algorithms. Most commercially available FTIR instruments come with pre-written software, for example, a Spectra Cal package for Galactic Industries Corporation, 395 Main Street, Salem, N. H. 03079, ready to deal with the integral equation. There are several known suppliers of FTIR spectroscopy systems, however, the present invention uses the MIDAC M Series FTIR spectrometer, which is designed to rapidly acquire complete high resolution spectra and is compatible with IBM compatible PC computers, and a data system with pre-installed software for printer and plotters. Data reduction capabilities include peak marking and identification, plotting multiple spectra overlay for comparison and advance smoothing functions. The FTIR spectrometer provides an interferogram that is a composite of all wavelengths in the entire spectrum, i.e. 4000–250 $cm^{-1}$ wavenumber using conventional connotations. Use of the Michelson interferometer as the grating means, i.e. for dispersion of the infrared beam across the spectrum in a matter of seconds, enables about 10 scans to be made in about 15 seconds.

Figure 1:
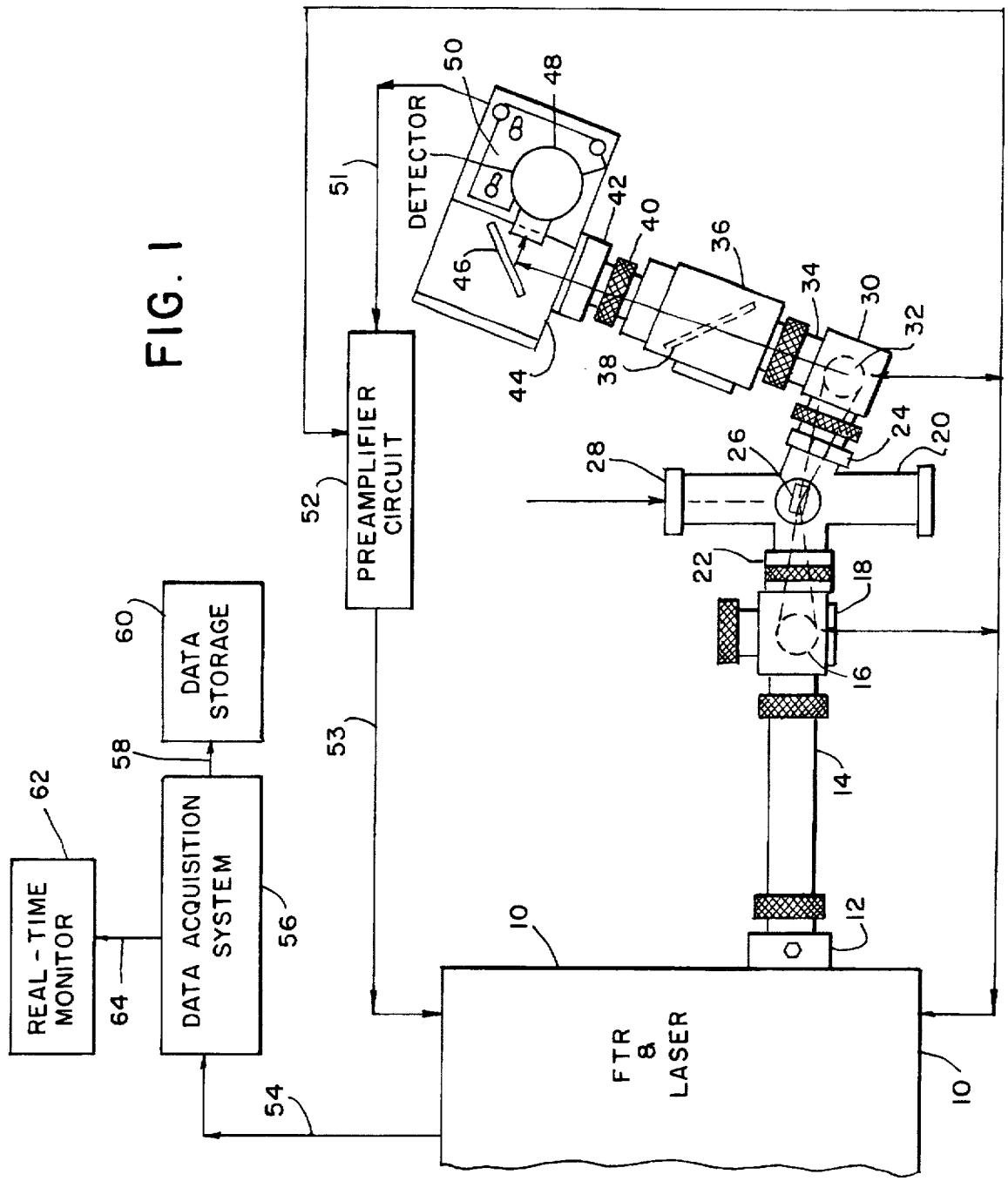
FIG. 1, depicts an arrangement of the apparatus and associated devices that may be used to practice the invention.

Referring now, to the drawings, there is shown in FIG. 1, a Fourier Transform Infrared (FTIR) control system 10, which is a modified version of the MIDAC M Series FTIR spectrometer, which for purpose of this disclosure, contains an infrared and laser light source for generating light beams of each, a Michelson-type interferometer for dispersion of the infrared beam, i.e. spreading or splitting up the beam across its entire spectra from 4000–250 $cm^{-1}$ wavenumbers. This spreading of the light beam is commonly termed "grating" the beam. An infrared and laser output beam port 12 is connected to a waveguide assembly 14 along which the infrared and laser beams travel where they intersect a first adjustable light transmission mirror 16 disposed along the beam path, where it is held in place by a fixture 18 connected to waveguide assembly 14 at its input end. The output end of fixture 18 is connected to a chamber 20 in which material samples may be examined. Chamber 20 of the present invention may be readily incorporated into a complementary analytical instrumentation arrangement selected from the group consisting of Auger electron spectroscopy, X-ray photo-electron spectroscopy, secondary ion mass spectroscopy, scanning electron, FTIR and optical microscopes. In such incorporated arrangements the results obtained from such complementary analytical instrumentation occur simultaneously as the FTIR results of the present invention are obtained, such that the various results can be monitored and compared on a real-time basis during the evaluation and analysis process of a sample material test.

Chamber 20 has an input window 22 and an output window 24 for entering and exiting beams, respectively. As shown, a test sample support platform and a sample material 26 are disposed within the chamber however, it should be noted that the sample could be a selected area of the interior of a chamber wall. Such an arrangement will be discussed hereinbelow in greater detail. Chamber 20 has a receiving port 28 that is used to access the inner chamber space. The output window end of chamber 20 is connected to an input end of a holding fixture 30 that contains a second adjustable mirror 32. During operation of the apparatus the infrared and laser beams are transmitted through mirror 16 and input window 20 to imping upon the sample of component 26, and thence through the chamber 20 and through its output window 24 so as to intersect second adjustable mirror 32. It should be noted that input and output transmission infrared beam windows 22 and 24, may be of materials from the group consisting of Potassium Bromine (KBr), Silicon (Si), Diamond, Cadmium Telluride (CdTe), Zinc Selenide (ZnSe), Magnesium Fluorine ($MgF_2$) and diamon coating of the foregoing materials. An output end 34 of mirror holding fixture 30 is connected to the input end of a third fixture 36, that holds a first fixed mirror 38 that is disposed along the beam path after passing through second adjustable mirror 32. It should be noted that mirror 38 is provided as an attenuation medium along the beam path, to reduce the signal level of the laser beam in some applications where the signal may be too high such that it may cause damage to detector 48. An output end 40 of fixture 36 is connected to an input end 42 of a fourth holding fixture 44, wherein a second fixed mirror 46 is disposed along the beam path, intercepting it and deflecting it to an infrared and laser detector device 48. Also shown in fourth fixture 44 is depicted a cooling device 50 for cooling detector device 48. A signal is outputted from detector 48 through an electrical conductor 51 to a preamplifier circuit 52, and the output thereof is fed to FTIR control system 10 along electrical conductor 53.

An output signal from FTIR control system 10 is fed along an electrical conductor 54 to a connected data acquisition system 56 that in turn feeds the collected data through electrical conductor 58 to a connected data storage device 60. The primary functions of the data acquisition system 56 and storage device 60 is to collect, store, transform, display and manipulate data collected by the FTIR control system 10 so that such data may be used on a real-time basis or later analyzed. The data acquisition system 56 has software necessary to manipulate Fourier transform (FFT) algorithms for proper data storage, display or plots of real-time FTIR surface chemistry as spectra graphs of absorbance versus wavenumbers of samples, both during and after test sample examination in chamber 20.

Figure 2:
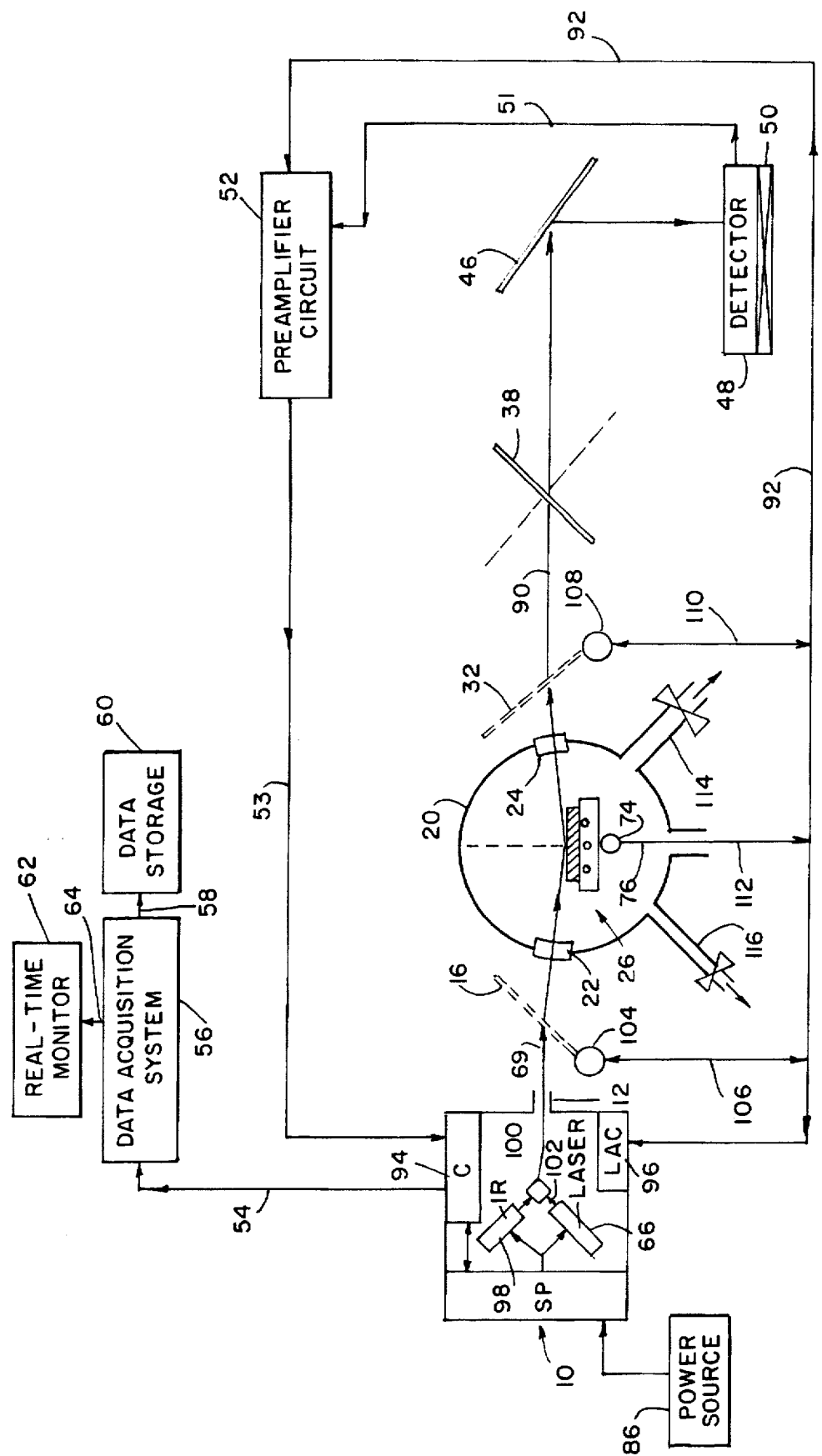
FIG. 2, is a simplified schematic view of an illustrative embodiment of the present invention shown in FIG. 1.

To continue with the disclosure of the present invention, reference is made to FIG. 2, wherein a simplified schematic of FIG. 1 is depicted for clarity of description. As shown FTIR control system 10 contains a laser source 66 which may be a HeNe type, and an infrared source, which may be silicon carbide, so as to create a dual light beam 69, a combination of a laser beam 102 and an infrared beam 100, that are transmitted through output beam port 12. Associated with these beam sources is a collector circuit 94 and a spectrophotometer 98 which are functional for systematization of collected data from detector 48 via preamplifier 52, and for transmitting such data to a data acquisition system 56 and thence to a data storage device 60.

Also included in FTIR control system 10 is an alignment controller circuit 96 which may receive feedback signals from moveable mirrors 16 and 32, and platform/material combination 26. These signals are fed to the controller circuit 96 through electrical conductor 92 so as to actuate one or more of a first electrically driven alignment device 104 connected to adjustable mirror 16, a second electrically driven alignment device 74 connected to support platform arrangement 26. It should be noted that each of the aforementioned components of the apparatus may in the alternative, be manually adjusted instead of electrically adjustment. In either event, information fed to the FTIR control system along 10 conductor 53 also provides information for manually adjusting the alignment of mirrors or platform to provide the desired alignment for the beam paths.

Continuing with the disclosure, it can be seen that the adjustable mirrors 16 and 32, material sample and support platform 26, the two fixed mirrors 38 and 46, and detector 48 are all disposed in the of a beam 90, and further terminates at detector 48. Also shown are electrical conductors 106, 110 and 112, each connected to electrical conductor 92, from their respective components, 104, 74 and 108, to transmit signals to the FTIR control system 10 useful for beam alignment.

The detector 48 may be a photoluminescence diode, made of materials selected from the group consisting of Lithium Tantalum Oxide (LiTa $O_3$) mercury cadmium telluride (MCT) or deuterated tri-glycene sulfate (DTGS) which affords good linearity and signal-to-noise ratio but must be operated at room temperature.

Figure 3:
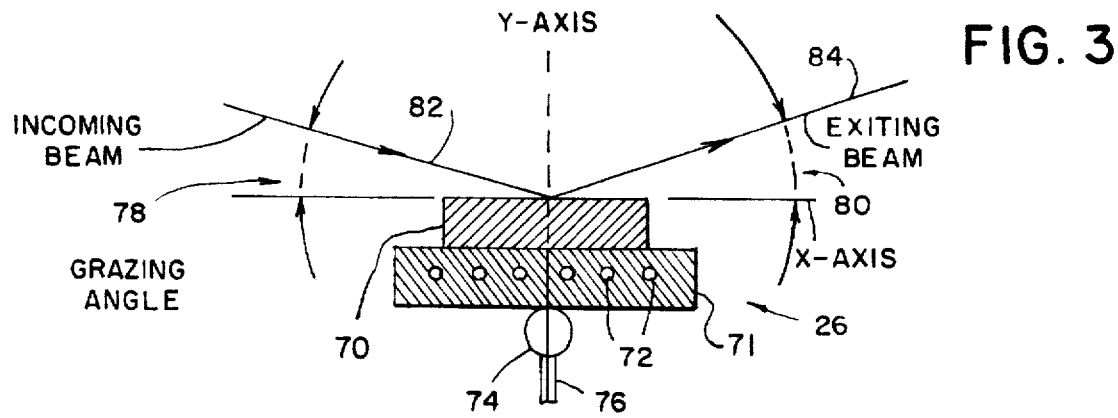
FIG. 3, is an enlarged view, partly in cross-section, of a material sample supported by a platform illustrating the presence of electrical heating elements and the grazing angle for the incident and exiting infrared light beams.

Referring now to FIG. 3, there is shown an enlarged view of a material sample 70 disposed on a support platform 71. As shown an incoming infrared beam 82 strikes sample 70 at a grazing angle 78 to an x-axis and exits as exiting beam 84, the angle on exiting is equal to the incoming beam angle 78. Also shown is electrically driven alignment device 74 connected to sample support platform 71, which may be adjusted manually or electrically to change the angles of the incoming and exiting beams. It can be seen that a conventional heating element 72 is provided within the body of platform 71 to provide heat to the sample and to elevate the temperature of chamber 20 and all the contents contained therein to selected temperatures. In the alternative, however, an electrical conducting heating element or pattern (not show in this figure) may be formed on a surface of platform 71 by means of laser conversion when platform 71 is a substrate of silicon carbide or aluminum nitride, in accordance with the teachings of U.S. patent Ser. No. 5,391,841, dated Feb. 21, 1995, and U.S. patent Ser. No. 5,145,741, dated Sep. 8, 1992, both issued to applicant. The latter technique for providing a heater element may be considered preferred because such heating elements have been found and proven to be excellent for elevated temperature operation in adverse gaseous environments, such as corrosive hydrogen chloride, as an example.

EXAMPLE

Figure 5:
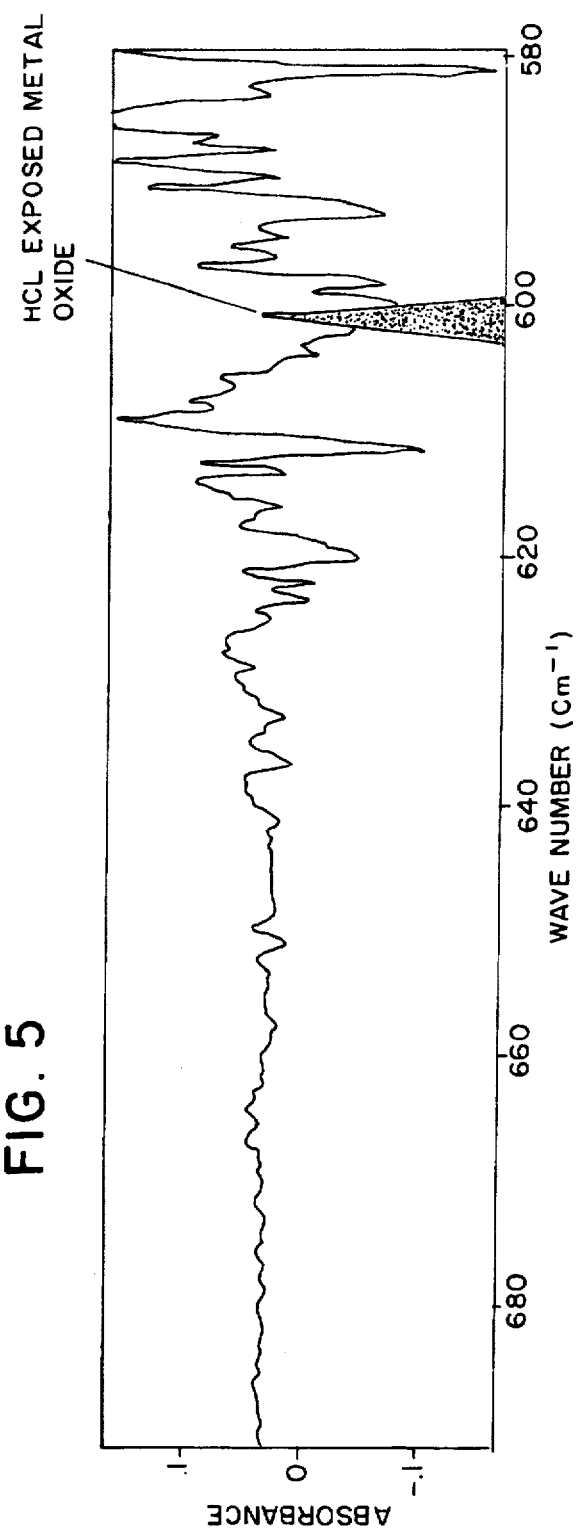
FIG. 5, illustrates a graphic plot of the spectrophotometer spectrum of the same HR-160 test sample of FIG. 4, illustrating that the absorption peak has decreased after exposure to infrared examination indicating a measured change in the chemical concentration on the test sample surface near a wavenumber of 600 $cm^{-1}$.
Figure 4:
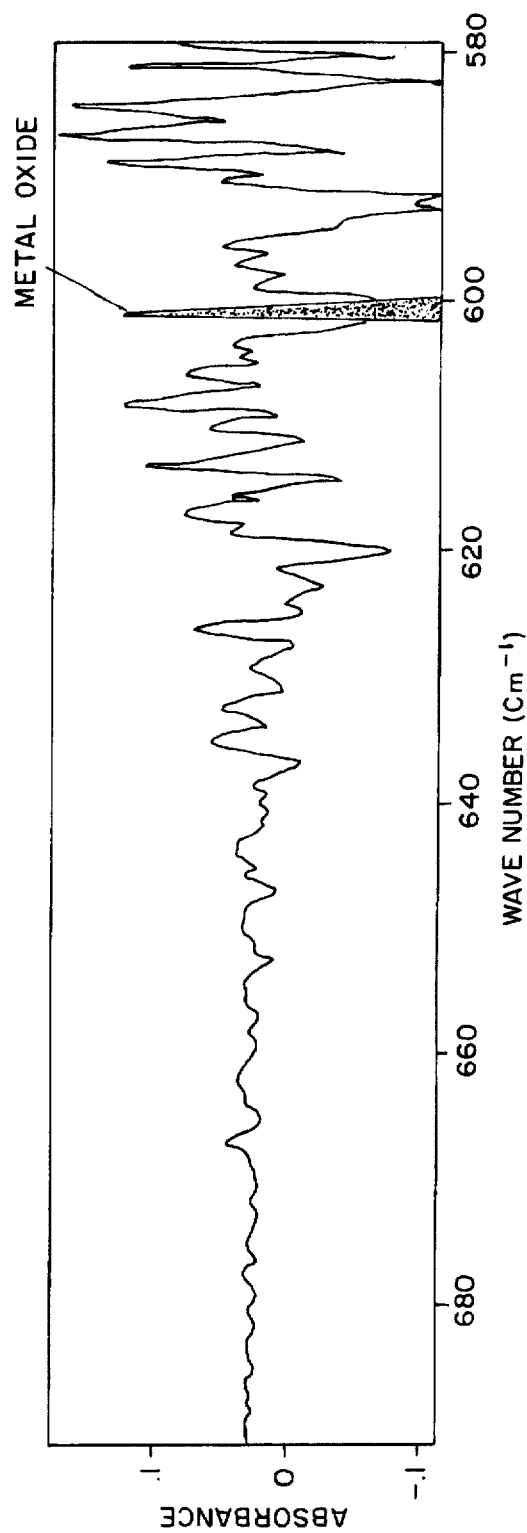
FIG. 4, illustrates a graphic plot of a typical spectrophotometer spectrum of an alloy HR-160 test sample before exposure to infrared examination illustrating an absorption peak at a wavenumber of 600 $cm^{-1}$.

The following example with reference to FIGS. 4 and 5, will serve to illustrate how the present invention operates to determine on a real-time basis what is measured and an analysis of a sample in accordance with the teaching thereof.

The spectrophotometer determines the changes in the intensity of a beam of infrared radiation as a function of frequency (wavenumber) after it interacts with the sample under observation. The spectrophotometer disperses the light from a broadband infrared source, such as that of FTIR control system 10, using a Michelson interferometer as the dispersing element, and it measures the intensity at each frequency from 4000–250 wavenumbers ($cm^{-1}$). The ratio of the intensity before and after the light interacts with the sample is determined. A typical plot of this ratio versus frequency is the infrared spectrum (reference: J. Neal Cox, Vibrational Spectroscopies, page 416).

In the present example a mercury cadmium telluride (MCT) detector 48 is used having a Potassium Bromine (KBr) detector window and is liquid nitrogen cooled by system device 50. The chamber windows 22 and 24 used were of KBr, which limited the chamber from operating at maximum temperatures.

In accordance with the teachings of the present invention, the change in infrared beam intensity results from the absorbance of specific frequencies by chemicals, particularly transition metal spinel oxides and metal halides (salts) formed during corrosion, existing or formed on the sample surface during exposure to high temperatures (200° C.) of the chamber and gases such as hydrogen chloride (37%) and water (63%) injected into the chamber 20. In this example, a sample used was an alloy HR-160 (37.7 wt % nickel, 28 wt % chromium, 29 wt % cobalt, 2.75 wt % silicon, 2 wt % iron 0.5 wt % manganese and 0.05 wt % carbon) forms oxides in air at room temperature form these elements to protect the base metal from chemical attack. Referring to FIG. 4 there is shown an absorption peak at 600 $cm^{-1}$ before exposure to the infrared beam. Data provided by Geoffrey C. Allen and Michael Paul, "Chemical Characterization of Transition Metal Spinel Oxides by Infrared Spectroscopy", APPLIED SPECTROSCOPY, Volume 49, Number 4, 1995, shows the highest absorption frequency band to range from 560 to 630 $cm^{-1}$ for transition metal spinel type oxides comprised of iron, cobalt, nickel, manganese and oxygen. Thus, an observation of an HR-160 oxide peak in this frequency band is plausible. It should be noted that the Allen and Paul data is obtained using transmission IR Spectral analysis through fine oxide powdered mixed with KBr, polyethylene or adamantine as the medium. In accordance with the teachings of the present invention, the oxide condition of the oxide, and resultant chlorides which indicates the onset of oxide destruction, and consequently corrosion, are examined in-situ as a solid or film on the alloy's surface using reflectance/absorbance. The y-axis is relative absorption intensity and the x-axis is frequency (wavenumbers in units of $cm^{-1}$). The y-axis relates to the concentration of an oxide and the x-axis identifies the oxide peak.

Referring now to FIG. 5, it can be seen that after the introduction of the HCl and water, the height of the peak at about 600 $cm^{-1}$ is decreased; the chemical concentration or amount of this oxide is decreased indicating a loss in the thickness or amount of protective oxide to resist corrosion. The 37% HCl+63% $H_2O$ mixture is chemically reducing the oxide. It should be noted that other reducing or oxidizing gaseous/vapor environments may be used such as $SO_2$, $SO_3$, $NH_4$, and $NO_X$. The importance is that the FTIR measurement is sensitive to the initiation of the corrosion process. It is actually sensitive to the "latent" corrosion process which is not monitored by other known technologies. Deterioration of the passive protective oxide is detected before the underlying alloy, metal etc. surface is attacked. The spectrophotometer is actually measuring the intensity of the remaining light (reflected light) after absorption by the sample's surface at each frequency. Absorption spectra are preferred for quantitative results because to the first order it is a linear function of concentration. The grazing angle relectionabsorption depicted in FIGS. 1, 2 and 3, are more sensitive than normal (perpendicular) incident measurements of very thin oxides and surface chemical layers because the electromagnetic field strength in the plane containing the incident and reflected radiation is greatly increased. In other words, the incident light intensity is higher and after interaction with the surface chemicals the absorbed intensity and reflected intensities are stronger.

The output intensity (I) from the sample interaction is eventually measured by the detector 48. The output intensity information is sent back to the spectrophotometer to determine the intensity ratio($I/I_o$) where $I_o$ is the incident or original beam intensity before interaction with the sample's surface at each frequency. This data is sent back to the PC computer where the data is analyzed using the MIDAC/ Galactic software. The data is displayed, wavenumbers are identified and labeled, and a chemical library assigns chemical names to peaks ( note that some chemicals may have two or more peaks or frequency bands).

It should be noted that the primary purpose of the laser 66 in the present spectrophotometer system is to monitor the direction and velocity of the moving mirrors which are measured by a pair of quadrature phase detectors in the FTIR control system 10, and for system alignment. Monitoring the moveable mirrors enables the control of the Michelson interferometer or "interferogram signal" and allows rapid data accumulation in only 10–15 seconds. Remember this is the dispersing or "light grating" element for infrared light: it forms the "channels" in the incident beam.

Figure 6:
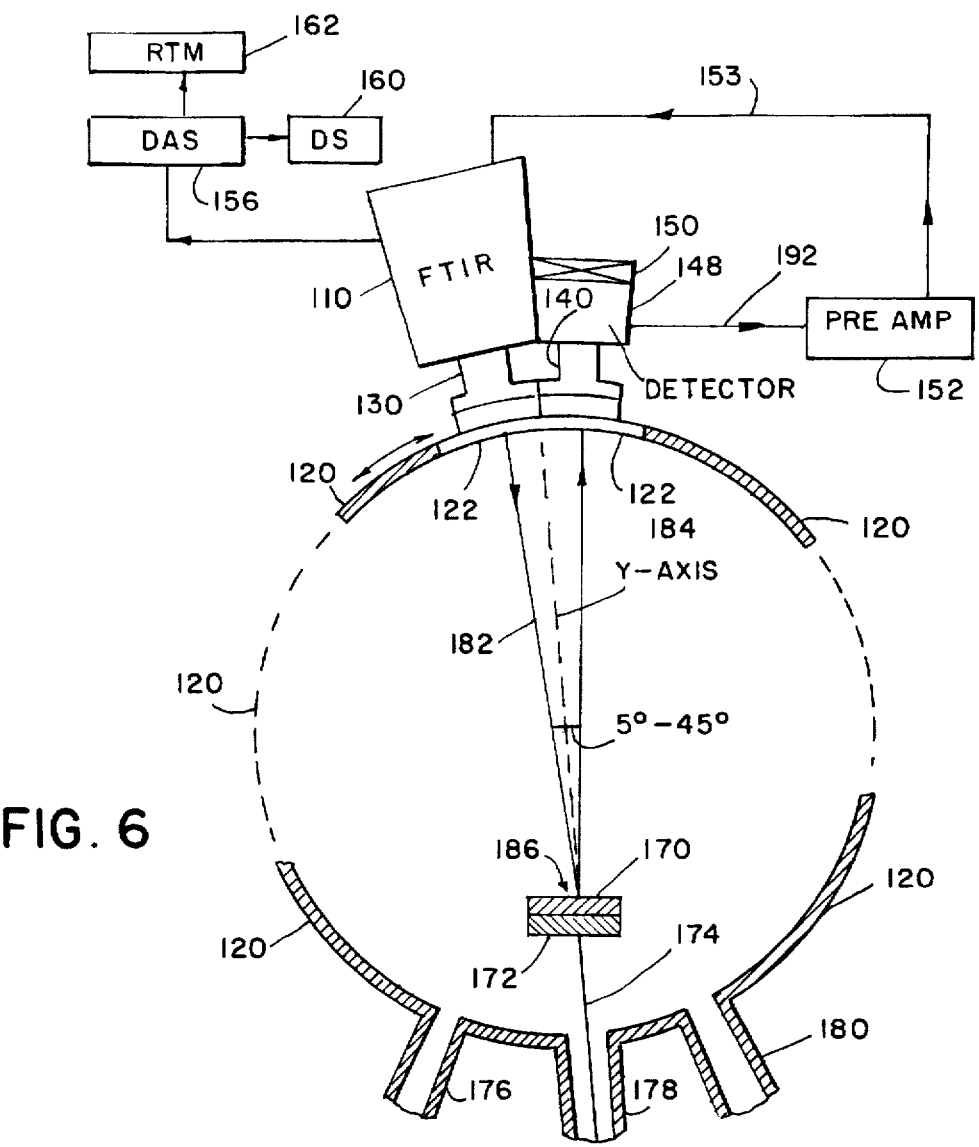
FIG. 6, is a simplified schematic view of an alternate embodiment of the present invention shown in FIGS. 1 and 2.

Referring now to FIG. 6, an alternative embodiment of the present invention, in which the incoming and exiting beams enter and exit through the single chamber window. As shown in FIG. 6, a FTIR control system 110 is disposed adjacent to a chamber 120, which may be of a cylindrical or spherical configuration, is shown in part by cross-section and a dotted line, and a window 122 for transmission of an incident infrared beam 182 and reflected beam 184. It should be noted that window 122 is enviornmentally resistant to heat and corrosive gases, such as Potassium Bromine (KBr). In addition, the input/output transmission infrared beam window 122 may be of materials from the group consisting of Potassium Bromine (KBr), Silicon (Si), Diamond, Cadmium Telluride (CdTe), Zinc Selenide (ZnSe), Magnesium Fluorine ($MgF_2$) and diamond coating of the foregoing materials. A test sample 170 is supported within chamber 120 by a sample support platform 172, so as to receive incident beam 182 platform 172 also includes an electrical heating element of one of the types discussed in connection with FIG. 3 and is connected to an electrical conductor 174 to provide electrical current thereto so as to provide an elevated temperature within chamber 122 and to sample 170. The electrical heater source for the heater is not shown, but conductor 174 and and means for supporting the heater and sample have access through a port 178 in the wall of chamber 120. There is also provided an inlet port 176 through the wall of chamber 120 for admitting selected gaseous mixtures into chamber, and a second port 180 provides access to chamber 120 for removal of gases therefrom. Neither the gas source or a gas removal device are depicted, since they may be conventional devices known in the prior art.

The angle between incident and exiting beam from a contact point 186 at the surface of sample 170 depicted in FIG. 6, has a preferred range of 5° to 45°, about a y-axis of the chamber arrangement. The exiting beam is detected by detector 148 through a receiving arrangement 140 which is in turn fed to a preamplifier circuit 152 by means of electrical conductor 192. The output of pre-amp 152 is fed back to FTIR 110 by means of electrical conductor 153. After systemization of the signal from pre-amp 152, it is fed to a data acquisition system 156, and is split into to two output signals, one to a real-time monitor system 162 and a data storage device 160, in a similar manner as that shown in FIG. 2.

Figure 7:
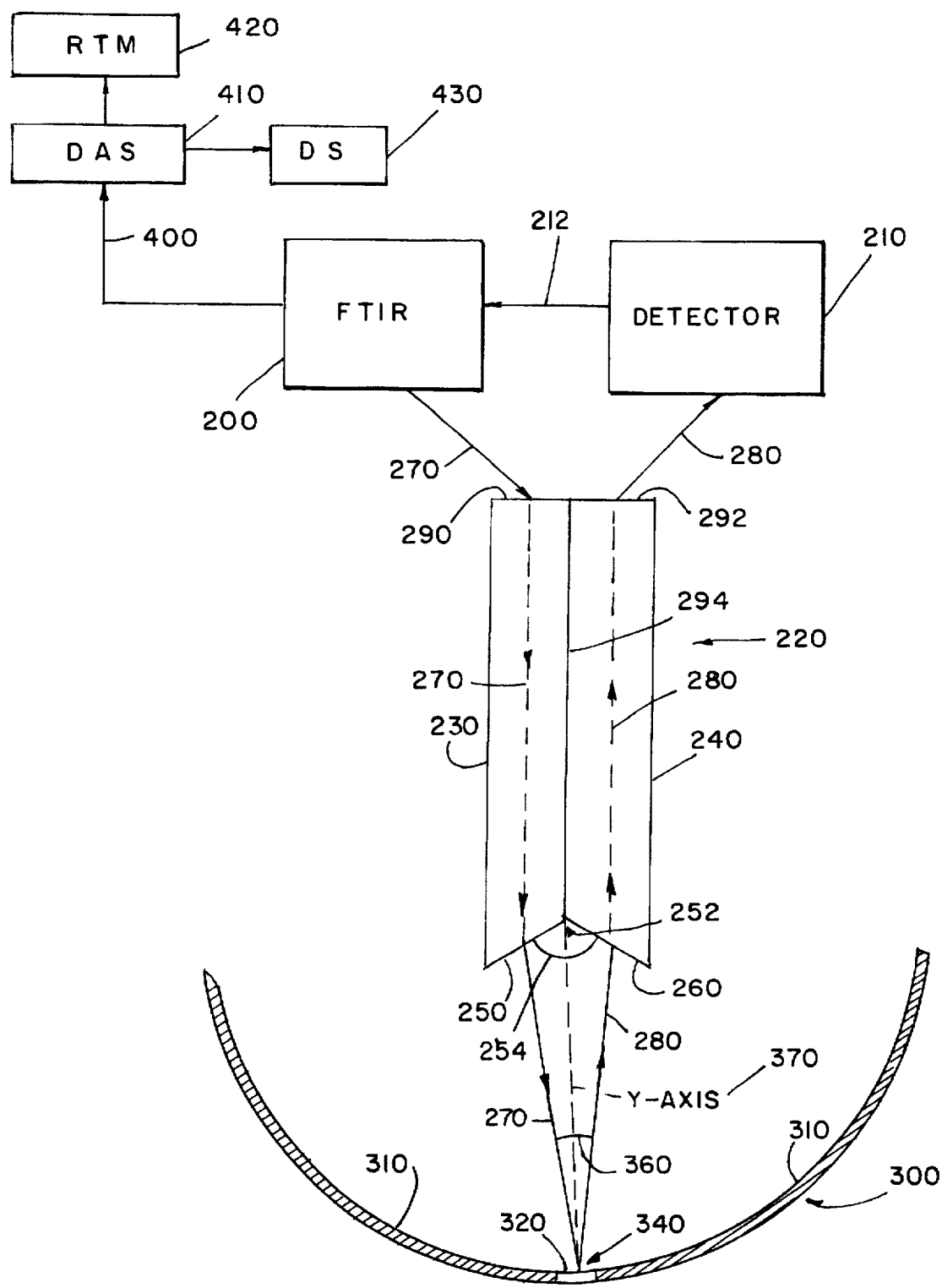
FIG. 7, is still another embodiment pursutant to the teachings of the present invention, wherein an apparatus is depicted that may be used as a field diagnostic system for examination, analysis and determinating the nature and scope of surface deterioration or failure of selected areas of the interior surface of a chemical processing container or chamber that was subjected to a $HCL+H_2O$ corrosive/erosive gaseous/vapor environment during the chemical process.

Referring now to FIG. 7, there is shown an apparatus that is useful as a field diagnostic system for examination, analysis and determinating the nature and scope of surface deterioriation or failure of selected areas of the interior surface of a chemical processing container or chamber that was subjected to a $HCL+H_2O$ corrosive/erosive gaseous/ vapor environment during the chemical process. As shown in FIG. 7, there is a FTIR control system (FTIR) 200, an infrared detector 210 disposed in spaced apart relationship to one another and in spaced apart relationship to a flexible bundle of infrared transmission fiber optics 220, comprising two parallel sections 230 and 240 divided by a parallel non-transmission divider member 294. Fiber optics section 230 has an infrared beam input surface 290 and an infrared beam output surface 250. In a similar manner fiber optics section 240 has a reflected infrared beam input surface 260 and an reflected infrared beam output surface 280. As shown surfaces 250 and 260 intersect at a point 252 along parallel member 294 forming equal angles with an y-axis designated 370.

The angular arrangement between these two surfaces 250 and 260, may be formed so as to provide a selected angular separation 360 between an incident and reflected infrared beam. By enlarging an angle 254, the beam separation increases and by decreasing angle 254, the beam separation is reduced. This simple arrangement provides a means for a wide range of control for varying the separation between the incident and reflected infrared beams. Continuing with the description of FIG. 7, an incident infrared beam 270 is transmitted to fiber optics bundle surface 290 to fiber optics bundle 230 exiting from surface 250 impinging upon an interior surface 310 of a container 300 in an surface area designated 320 at an intersection point 340. The surface area 320 is analogous to the test samples discussed hereinabove with respect to FIGS. 1,2 and 6.

As shown in FIG. 7, incident infrared beam 270 is reflected as a beam 280, intercepting reflected input angular surface 260 at an angle equal to and/or complementary to, that of beam 270, with respect to y-axis 370. Beam 280 is transmitted to infrared detector 210, by a conductor 212, where it is subsequently fed to FTIR control system 200 for processing in accordance with the teachings of the present invention. As discussed hereinabove with respect to FIGS. 1, 2 and 6, a signal 400 is fed from FTIR control system 200, to a data acquisition system (D.A.S.) 410 and subsequently to a real time monitor (R.T.M.) 420 and data storage device (D.S.) 430, respectively, for use in accordance with the teachings of the present invention.

For purposes of discussing FIG. 7, it should be noted that container 300 is of an alloy HR-160, as discussed hereinabove and it was used with a chemical process where the internal environment was equal and/or equivalent to the $HCl+H_2O$ corrosive/erosive gaseous/vapor and elevated temperature environment as that from which FIG. 5 was derived. Consequently, the results derived by using the arrangement of FIG. 7, were comparable, since the starting spectrum profile for container 300, shown as a portion thereof in cross-section, before its exposure to the hostile chemical processing environment was of the same material as the sample material whose characteristics are depicted in FIG. 4, i.e. before exposure to gaseous/vapor and elevated temperatures. Thus, it can readily be appreciated by those knowledgeable in the prior art of the present invention, that the arrangement shown in FIG. 7, is a highly useful and advantageous tool for providing corresponding results as with arrangements of FIGS. 2 or 3, by use of a portable field tool or apparatus of the type depicted in FIG. 7.

The apparatus depicted in FIG. 7, consisting of flexible bundle light transmission fiber optics 220, FTIR control system 200, infrared detector 210, data acquisition system 410, real-time monitor 420, and data storage device 430 may be utilized to examine and analyze the interior surface of an enclosure similar to the enclosure 120 shown in FIG. 6, which does not have ports 176, 178 and 180, while it is operating in an active processing mode with the corrosive/erosive gaseous/vapor and elevated temperature environment as part of the operation mode. In such mode of operation selected areas of the interior surface walls of the enclosures may be considered as a sample of material of interest and observation by use of the enumerated apparatus from FIG. 7. Access to the interior of an enclosure is accomplished through an input/output infrared beam window of the type disclosed in reference to FIG. 6, i.e. window 122 of FIG. 6.

The foregoing embodiment operates in accordance with teachings of the present invention and is intended to be used as a portable field system than that shown in FIGS. 2 and 3 and therefore, is not as precision a device as that depicted in FIGS. 2 and 3. However, it should be noted that the reflection-absorption signal received by infrared detector 200 may be less than optimum when a grazing angle of near 10° with respect to the x-axis of test sample surface area is used, and therefore, is not considered to be the preferred mode of operation when use for deriving a standard characteristic profile of a material.

The foregoing disclosure and teachings of the present invention readily and adequately demonstrated that real-time life assessment and analysis of the accelerated deterioration effects of corrosion/erosion of materials, devices and structures while exposed to elevated temperature and hostile gaseous environment, can be used thereby solving long standing problems in the prior art with regard to corrosion/erosion of materials. The teachings of the present invention are clearly applicable for extensive use to determine and monitor deterioration effects caused by corrosion/erosion of materials in such industries as paint, electronics, metal fabrication and chemical industries on a real-time and accelerated basis or in the alternative as an after the fact technique of surface analysis of possible failure evaluation and/or determination for on-site field situations. It should be understood that the above described embodiments are only illustrative of the principles applicable to the invention. Various other arrangements and modifications may be defined or devised by those skilled in the art without departing from the spirit and scope of the invention. Consequently, is it understood that the present invention is limited only by the disclosure and appended claims.

What is claimed as new is:

1. A method for monitoring and analyzing in real-time the corrosive-erosive effects on materials introduced into a chamber at elevated temperatures in the presence of hostile gaseous atmosphere to simulate the accelerated life and deterioration of the materials for life assessment studies, the method comprising the steps of:

a. providing a fourier transform infrared spectrophotometer and laser control system for generating and transmitting infrared and laser beams to a chamber, for systematized collection and processing of detected infrared spectrum data and laser feed-back signals, and further for transmission of the systematized infrared spectrum data to acquisition, storage and monitoring systems;

b. providing acquisition, storage and monitoring devices that examine and analyze detected infrared spectra data on a continuous real-time basis indicative of the accelerated life effects on said material sample within said chamber and still utilized for after-test analysis of recorded and stored infrared spectra data;

c. providing a chamber equipped with an input environmentally resistant window for transmission of a infrared light and laser light beam into the chamber and an output environmentally resistant window for transmission of exiting infrared and laser light, the chamber being further equipped with an input port and valve and an output port and valve for introducing gases into the chamber and the removal therefrom, respectively, the chamber still further being equipped for receiving a material sample support platform, a material sample and energizing electrical power to said support platform;

d. providing a material sample as the target for receiving continuous impinging incident infrared and laser beams thereby producing exiting reflecting infrared beam spectra data from said material sample indicative of surface and sub-surface conditions and other material species thereof on the an ongoing and real-time basis;

e. supplying one or more gases from gas sources to the input port of said chamber, and drawing a vacuum or removal of said gases with a vacuum or removal device through the output port of said chamber;

f. supplying energizing electrical power to said sample support platform having an environmentally resistant electrical element incorporated therein for providing elevated temperatures to said chamber and material sample, providing electrical means for angular orientational adjustment of the material sample support platform along the path of the said infrared and laser beams;

g. providing a first moveable transmission mirror between said fourier transform infrared spectrometer control system and said chamber and a second moveable transmission mirror on said output window side of said chamber, both moveable mirrors being disposed along the paths of infrared and laser beams, further providing a first and second fixed transmission and reflective mirrors beyond said second moveable transmission mirror along the path of the infrared and laser beams, still further providing a detector device disposed in spaced apart relationship to said second fixed transmission and reflective mirror for receiving reflected infrared and laser signals to said fourier transform infrared spectrometer control system for systematization data collection and processing;

h. illuminating said test sample within said chamber through said input transmission window with a dispersed infrared light and laser light beam, said beams passing through said first moveable mirror enroute to said chamber for impinging upon said test sample at selected grazing angles, said light beams thereafter being reflected therefrom and exited from said chamber through said output transmission window and thence through said second moveable mirror, and said first and second fixed mirrors to said detector device;

i. providing an infrared and laser sensitive detector device along the path of said infrared and laser beams useful with said fourier infrared transform spectrophotometer control system for detecting the exiting infrared light spectra of repetitive incidents of infrared light beam impinging upon the surface of said material sample and exited through the output beam transmission port of said chamber and providing a spectrum indication of the presence and extent of corrosive-erosive deterioration effects at the surfaces and sub-surfaces of said material sample and other surface species that may occurred thereon;

j. detecting and analyzing the exited infrared beam on a real-time basis providing an indication of the presence and extent of corrosive-erosive effects upon the surface and sub-surface of said test sample as a result of exposure to elevated temperature and gaseous environment within said chamber and k. further providing laser means for processing feed-back laser signals for alignment adjustment of infrared transmission mirrors to selectable grazing angles for said impinging infrared beam as it strikes a target sample.

2. Method of claim 1, in which said characterization of the presence of chemical species upon a surface of said material sample after exposure to said broadband infrared light beam at elevated temperatures is identified by a wavenumber $cm^{-1}$.

3. An apparatus for monitoring and analyzing in real-time the corrosive-erosive status and effects on and the extent of change in the surface conditions and species of a material introduced into a chamber that is subjected to an impinging broadband frequency infrared light beam at elevated temperatures in the presence of hostile gaseous atmosphere in the chamber to simulate the accelerated life and deterioration thereof, the combination comprising:

a. a fourier transform infrared control system for providing and outputting continuous broadband infrared and laser light beams, utilized to impinge upon material samples under test and measurement, and collecting and systematizing detected reflected and absorbed infrared and laser light signals for examination and analysis;

b. a chamber having an X and Y axis and being disposed in spaced apart relationship to said fourier transform control system to receive the infrared and laser light beams outputted therefrom, and being equipped with an environmentally resistant input and output window for receiving incident infrared and laser light beams and for exiting reflected components thereof, respectively, and further being equipped with an input and output gas port, and still further being equipped and adapted for receiving and supporting a material sample, the surface which is to be the examined and spectroscopically analyzed for the presence and extent of chemical species and changes in the physical and chemical conditions thereof, and said material sample being disposed within said chamber to receive incoming infrared and laser light beams at selected incident grazing angles with respect to the X-axis of said chamber;

c. a pair of adjustable mirrors, a first mirror being disposed in spaced apart relationship between said fourier transform infrared control system and said chamber and a second mirror being disposed in spaced apart relationship to said output window of the chamber along a path of said exiting light beams, said pair of mirrors being equipped and adapted for separate monitoring and adjustment to achieve and maintain control of the path of the infrared and laser light beams into and out of the chamber;

d. a light detection and measuring means for receiving infrared and laser light exited through the output window of the chamber and generating signals proportional to the detected light and providing an indication of the surface condition of a material sample subjected to said infrared light beam;

e. a pair of fixed mirrors disposed in space apart relationship with said second adjustable mirror along said infrared light beam after passing therethrough, said second fixed mirror also being disposed in spaced apart relationship to said light detection means for transmitting reflected infrared and laser light thereto;

f. an analyzer system connected to said fourier transform control system for receiving collected and systematized signals for analyzing signals proportional to the detected light and providing and indication of the presence of chemical species present upon the material sample and of the changes in the material sample due to corrosive-erosive effects;

g. a gas source connected to the input port of said chamber and a gas removal source connected to the output port of said chamber to cause the measurement of the material sample to occur in a selected hostile gaseous environment;

h. an electrical heat source connected to a material support platform disposed within said chamber to cause the measurement of the material sample to occur at selected elevated temperatures; and i. a laser means for processing feed-back laser signals for alignment adjustment of infrared transmission mirrors to selectable grazing angles for said impinging infrared beam as it strikes a target sample.

4. An apparatus for monitoring and analyzing in real-time the corrosive-erosive status and effects on and the extent of change in the surface conditions and species of a material introduced into a chamber that is subjected to an impinging broadband frequency infrared light beam at elevated temperatures in the presence of hostile gaseous/vapor, atmosphere in the chamber to simulate the accelerated life and deterioration thereof, the combination comprising:

a. a fourier transform infrared control system for providing and outputting continuous broadband infrared light beam, utilized to impinge upon material samples under test and measurement, and collecting and systematizing detected reflected and absorbed infrared light signals for examination and analysis;

b. a chamber having a Y-axis and being disposed in spaced apart relationship to said fourier transform control system to receive the infrared light beam outputted therefrom, and being equipped with an environmentally resistant combination input and output window for receiving incident infrared light beam and for existing reflected components thereof, and further being equipped with means for receiving and supporting a material sample, for examination and spectroscopic analysis for the presence and extent of chemical species and changes in the physical and chemical conditions thereof, and said material sample being disposed within said chamber to receive incoming infrared light beam at selected incident angles with respect to the Y-axis of said chamber;

c. a light detection and measuring means for receiving reflected infrared light exited through said output window of the chamber and generating signals proportional to the detected light and providing an indication of the surface condition of a material sample subjected to said infrared light beam;

d. an analyzer system connected to said fourier transform control system for receiving collected and systematized signals for analyzing signals proportional to the detected light and providing an indication of the presence of chemical species present upon the material sample and of the changes in the material sample due to corrosive-erosive effects;

e. a gas source connected to said chamber and a gas removal source connected to said chamber to provide a selected hostile gaseous environment therein; and f. an electrical heat source connected to a material support platform disposed within said chamber to provide a selected elevated temperatures therein.

5. An apparatus of claim 4, in which said characterization of the presence of chemical species upon a surface of said material sample after exposure to said broadband infrared light beam at elevated temperatures is identified by a wavenumber $cm^{-1}$.

6. A method for monitoring and analyzing in real-time the corrosive-erosive status and effects on and the extent of change in the surface conditions and species of a material introduced into a chamber that is subjected to an impinging broadband frequency infrared light beam at elevated temperatures in the presence of hostile gaseous atmosphere in the chamber to simulate the accelerated life and deterioration thereof, the method comprising the step of:

a. providing a fourier transform infrared control system for generating and outputting a continuous broadband infrared light beam, utilized to impinge upon material samples under test and measurement, and collecting and systematizing detected reflected and absorbed infrared light signals for examination and analysis;

b. providing a chamber having an Y-axis to receive continuous broadband infrared light beams from said fourier transform control system transmitted through an environmentally resistant combination input and output window of said chamber for transmitting therethrough incident infrared light beam and for exiting therethrough reflected components thereof, and further providing means for receiving and supporting a material sample therein for exposure to said incident infrared light beam at selected incident angles with respect to the Y-axis of said chamber for examination and spectroscopic analysis for the presence and extent of chemical species and changes in the physical and chemical conditions thereof;

c. providing an infrared light beam detection and measuring means for receiving reflected infrared light beam exited through said output window of said chamber and generating signals proportional to the detected light beam so as to provide data indicating the surface condition of said material sample subjected to said infrared light beam;

d. providing an analyzer system connected to said fourier transform control system for receiving collected and systematized reflected infrared signals from said material sample to provide data, analysis and characterization of the presence of chemical species present upon said material sample and of the changes in said material sample due to corrosive-erosive effects;

e. providing a gas source and a gas removal device connected to said chamber to provide a selected hostile gaseous environment therein; and f. proving an electrical heat source connected to a material sample support platform disposed within said chamber to provide a selected elevated temperatures therein.

7. Method of claim 6, in which said characterization of the presence of chemical species upon a surface of said material sample after exposure to said broadband infrared light beam at elevated temperatures is identified by a wavenumber $cm^{-1}$.

8. Method of claim 6, in which said characterization of the presence of chemical species upon a surface of said material sample after exposure to said broadband infrared light beam at elevated temperatures is identified by a wavenumber $cm^{-1}$.

* * * * *